United States Patent Office 3,249,592
Patented May 3, 1966

3,249,592
VINYL STEARATE-MALEIC ANHYDRIDE
COPOLYMERS
Charles Ernest Blades, Berkeley Heights, and Stanley Joseph Dumovich, Edison, N.J., assignors, by mesne assignments, to Cumberland Chemical Corporation, New York, N.Y., a corporation of Delaware
No Drawing. Filed Oct. 19, 1960, Ser. No. 63,465
9 Claims. (Cl. 260—78.5)

This invention relates to copolymers of vinyl stearate and maleic anhydride, and to methods for forming the same.

It is an object of this invention to provide low molecular weight copolymers of vinyl stearate and maleic anhydride.

It is a further object of this invention to prepare alkyl esters of the vinyl stearate-maleic anhydride copolymers of this invention.

It is a still further object of this invention to provide a solution polymerization process for making the novel copolymers of this invention.

The vinyl stearate-maleic anhydride copolymers of this invention are prepared by copolymerizing 90 to 95 parts by weight of vinyl stearate with 5 to 10 parts by weight of maleic anhydride in the presence of a chain transfer agent. The chain transfer agent generally also serves as the reaction medium, although an inert organic solvent may be used in addition to the chain transfer agent where desired. Also present is a free radical initiator such as benzoyl peroxide. Polymerization is carried out at a temperature from about 50° C. to the boiling point of the reaction mixture, preferably from about 75° to about 100° C. The resulting copolymers contain from 90 to 95 parts by weight of vinyl stearate and from 5 to 10 parts by weight of maleic anhydride, based on 100 parts combined weight of vinyl stearate and maleic anhydride. This corresponds to 2.8 to 6 moles of vinyl stearate per mole of maleic anhydride. These polymers have an average molecular weight of about 1000 to 3000. In view of the low molecular weights of the polymers a substantial quantity of chemically combined residue of the chain transfer agent is also present.

Methyl ethyl ketone is a preferred chain transfer agent and solvent. Other ketones, such as methyl propyl ketone, methyl isopropyl ketone, and methyl isobutyl ketone, aldehydes such as butyraldehyde and valeraldehyde, and chlorinated hydrocarbons such as carbon tetrachloride, 1,2-dichloroethane and 1,3-dichloropropane may be substituted for methyl ethyl ketone as the chain transfer agent. Generally the chain transfer agent also constitutes the solvent. Where a highly active chain transfer agent such as carbon tetrachloride is used, it is frequently desirable to dilute the chain transfer agent with an inert organic solvent. The preferred solvents and chain transfer agents have boiling points from about 75° to about 120° C.

Various organic compounds can be used as free radical initiators. Preferred free radical initiators are organic peroxides such as benzoyl peroxide. Other peroxides such as lauroyl peroxide, ditert.-butyl peroxide, tert.-butyl hydroperoxide, caproyl peroxide, and dicumyl peroxide can be substituted for benzoyl peroxide. Another free radical initiator for the present process is α,α'-azobis(isobutyronitrile). The amount of free radical initiator is usually in the range of about 0.8 to 1.2 percent of the combined weights of vinyl stearate and maleic anhydride.

The copolymers of this invention can be prepared by adding maleic anhydride to a solution of vinyl stearate in the chain transfer agent or inert organic solvent. The maleic anhydride can be added more readily if it is dissolved in the chain transfer agent or solvent. Since maleic anhydride polymerizes very rapidly while vinyl stearate polymerizes much more slowly, it is necessary to add the maleic anhydride gradually as the reaction proceeds. Substantially homogeneous copolymers are obtained by adding the maleic anhydride to the vinyl stearate solution at a uniform rate throughout the course of polymerization. It is also desirable to add the catalyst in increments as polymerization proceeds. The polymerization temperature is from 50° C. to the boiling point of the solution, preferably from 75° to 100° C., as previously noted. Polymerization usually requires from 3 to about 6 hours. The copolymer can be obtained by evaporating the residual solvent and chain transfer agent at reduced pressure.

The copolymers of this invention are crystalline, waxy materials. They are useful as polishing ingredients in waxes especially self-polishing waxes for floors, automobiles, and the like. A preferred copolymer for this purpose contains 92.5 parts by weight of vinyl stearate, and 7.5 parts by weight of maleic anhydride. This copolymer may be dispersed wtih conventional nonionic emulsifiers containing no more than one hydroxyl group per molecule to give a self-polishing floor wax in which the vinyl stearate-maleic anhydride copolymer is present in about 8 to 15 percent (preferably about 12 percent) by weight.

The vinyl stearate-alkyl maleate copolymers of this invention can be prepared by reacting the vinyl stearate-maleic anhydride copolymers of this invention with a saturated aliphatic monohydric alcohol containing from 1 to 18 carbon atoms under esterifying conditions. The resulting vinyl stearate-alkyl maleate copolymers contain from 2.8 to 6 moles of vinyl stearate per mole of alkyl maleate, and have an average molecular weight of about 1000 to about 5000, depending on the molecular weights of the alcohol and the starting copolymer. Straight chain alcohols and branched chain alcohols with only a limited amount of branching are preferred to highly branched chain alcohols. Dialkyl esters of the lower aliphatic alcohols are easily formed. As the chain length and degree of branching increase, dialkyl ester formation becomes more difficult. The higher molecular weight alcohols, particularly the branched chain structure, readily form monoesters by reaction with maleic anhydride, but form dialkyl esters with difficulty if at all. Specific alcohols which can be reacted with vinyl stearate-maleic anhydride copolymers according to this invention include methanol, ethanol, butanol, isobutyl alcohol, hexanol, octyl alcohol, 2-ethyl-1-hexanol, lauryl alcohol, and stearyl alcohol. Esterification proceeds under conventional esterifying conditions, e.g. elevated temperature (preferably about 80° to 120° C.) with or without a catalyst.

The vinyl stearate-2-ethylhexyl maleate copolymers of this invention are illustrative of the vinyl stearate-alkyl maleate copolymers. These copolymers contain from about 79 to about 89 parts by weight of vinyl stearate and from about 11 to about 21 parts by weight of 2-ethylhexyl maleate monoester. This is equivalent to vinyl stearate-2-ethylhexyl maleate mole ratios of 2.8:1 to 6:1. These copolymers can be prepared by adding 2-ethylhexyl alcohol in stoichiometric amount or slight excess of that required to form the monoester to a molten body of vinyl stearate-maleic anhydride copolymer at a temperature of about 80° to about 120° C. with or without a catalyst. Excellent results are obtained by esterifying without a catalyst at 95° to 105° C.

The vinyl stearate-alkyl maleate copolymers of this invention are useful as external plasticizers for polyvinyl chloride and other polymers.

This invention will now be illustrated with respect to specific embodiments thereof as shown in the following examples.

EXAMPLE 1

A solution of 475 grams of vinyl stearate in 60 grams of methyl ethyl ketone containing 3.5 grams of benzoyl peroxide is charged to a two-liter kettle equipped with a water-cooled reflux condenser, thermometer, dropping funnel, nitrogen inlet tube, and paddle type agitator. Nitrogen is introduced below the surface of the solution at a rate of about 200 bubbles per minute throughout the entire run. To this solution is added a solution of 25 grams of maleic anhydride in 15 grams of methyl ethyl ketone continuously at a uniform rate throughout a three-hour period. After the addition of the maleic anhydride monomer is complete, an additional 1.5 grams of benzoyl peroxide is added and the reaction mixture is maintained at a polymerization temperature of about 85° to 90° C. for an additional 2½ hours. Heat is then withdrawn and the system subjected to reduce pressure for 30 minutes to remove unreacted methyl ethyl ketone. After the unreacted methyl ethyl ketone is removed, the reaction mixture is allowed to cool to room temperature. The copolymer thus obtained contains 95 parts by weight of vinyl stearate and 5 parts by weight of maleic anhydride. Also present in the product are 2 parts by weight of residual vinyl stearate monomer, 0.25 part by weight of residual maleic anhydride monomer, and 1.0 part by weight of benzoyl peroxide. The properties of this copolymer are shown in Table I below.

EXAMPLE 2

A solution of 462.5 grams of vinyl stearate in 60 grams of methyl ethyl ketone containing 3.25 grams of benzoyl peroxide is charged to a two-liter kettle equipped with a water-cooled reflux condenser, thermometer, dropping funnel, nitrogen inlet tube, and paddle type agitator. Nitrogen is introduced below the surface of the solution at a rate of about 200 bubbles per minute throughout the entire run. To this solution is added a solution of 37.5 grams of maleic anhydride in 30 grams of methyl ethyl ketone continuously at a uniform rate throughout a four-hour period. After the lapse of 2 hours one gram of benzoyl peroxide dissolved in 10 grams of methyl ethyl ketone is added to the reaction mixture, and after 4 hours another 0.5 gram of benzoyl peroxide dissolved in 5 grams of methyl ethyl ketone is added. A polymerization temperature of 85° to 88° C. is maintained. When the addition of maleic anhydride monomer is complete, the system is subjected to reduced pressure for 1¼ hours to remove unreacted methyl ethyl ketone. The mixture is agitated vigorously while under reduced pressure to prevent localized heating. After the unreacted methyl ethyl ketone is removed, the reaction mixture is allowed to cool to room temperature. The copolymer thus obtained contains 92.5 parts by weight of vinyl stearate and 7.5 parts by weight of maleic anhydride. Also present in the product are 1.5 parts by weight of residual methyl ethyl ketone and 1.6 parts by weight of residual vinyl stearate monomer. The properties of the copolymer are shown in Table I below.

EXAMPLE 3

A solution of 462.5 grams of vinyl stearate and 15 grams of maleic anhydride in 70 grams of methyl ethyl ketone containing 2.5 grams of benzoyl peroxide is charged to a two-liter kettle equipped with a water-cooled reflux condenser, thermometer, dropping funnel, nitrogen inlet tube, and paddle type agitator. Nitrogen is introduced below the surface of the solution at a rate of about 200 bubbles per minute throughout the entire run. To this solution is added a solution of 22.5 grams of maleic anhydride in 22.5 grams of methyl ethyl ketone, at a rate of 7.5 grams of maleic anhydride per hour for the first 2 hours and 3.75 grams of maleic anhydride per hour for the next 2 hours. After the lapse of 2 hours 1.5 grams of benzoyl peroxide is added to the reaction mixture, and after 3½ hours another 1.0 gram of benzoyl peroxide is added. When the addition of maleic anhydride is complete, the system is subjected to reduced pressure to remove unreacted methyl ethyl ketone. After the unreacted methyl ethyl ketone is removed, the reaction mixture is allowed to cool to room temperature. The copolymer thus obtained contains 92.5 parts by weight of vinyl stearate and 7.5 parts by weight of maleic anhydride, and is more nearly homogenous than the polymer of Example 2. Also present in the product is 3.4 parts by weight of vinyl stearate monomer. The properties of the copolymer are sown in Table I below.

EXAMPLE 4

A solution of 450 grams of vinyl stearate and 125 grams of methyl ethyl ketone containing 3 grams of benzoyl peroxide is charged to a two-liter kettle equipped with a water-cooled reflux condenser, thermometer, dropping funnel, nitrogen inlet tube, and paddle type agitator. Nitrogen is introduced below the surface of the solution at a rate of about 200 bubbles per minute throughout the entire run. To this solution is added a solution of 50 grams of maleic anhydride in 40 grams of methyl ethyl ketone continuously at a uniform rate throughout a four-hour period. After the lapse of 2 hours 0.5 gram of benzoyl peroxide dissolved in 5 grams of methyl ethyl ketone is added to the reaction mixture and after 4 hours another 0.5 gram of benzoyl peroxide dissolved in 5 grams of methyl ethyl ketone is added. The reaction mixture is maintained at a temperature of 80° to 85° C. After the addition of the maleic anhydride monomer is complete, the system is subjected to reduced pressure for one hour to remove unreacted methyl ethyl ketone. The reaction mixture is then allowed to cool to room temperature. The copolymer thus obtained contains 90 parts by weight of vinyl stearate and 10 parts by weight of maleic anhydride. The reaction mixture also contains 3.5 parts by weight of residual methyl ethyl ketone and 2.0 parts by weight of residual vinyl stearate monomer plus 0.8 part by weight of benzoyl peroxide. The properties of the copolymer are shown in Table I below.

The properties of the copolymers obtained in Examples 1, 2, 3, and 4, containing 5 percent, 7.5 percent, 7.5 percent, and 10 percent by weight of maleic anhydride, respectively, are as follows:

*Table I*

|  | Example 1 | Example 2 | Example 3 | Example 4 |
|---|---|---|---|---|
| Melting Point, °C | 42–46.5 | 43.5–46 | 45 | 45–56 |
| Melt Viscosity at 90° C., cps | 5,720 | 10,200 | 7,900 | Very viscous |
| Viscosity in 50 percent Solution in Mineral Spirits at 20° C., cps | 112 | 156 | 120 | 115 |
| Shore Hardness at 22° C., kg./cm.³ | 99 | 98 | 93 | 96 |

The melt viscosity and the solution viscosity in the foregoing table are determined with a Brookfield Viscometer, Model LVF, at 30 r.p.m. The Shore Hardness is determined with a Shore Constant Load Durometer Type A–2 Code XACL.

EXAMPLE 5

A solution of 450 grams of vinyl stearate and 125 grams of methyl ethyl ketone containing one gram of α,α'-azobis(isobutyronitrile) is charged to a two-liter kettle equipped with a water-cooled reflux condenser, thermometer, dropping funnel, nitrogen inlet tube, and paddle type agitator. Nitrogen is introduced below the surface of the solution at a rate of about 200 bubbles per minute throughout the entire run. To this solution is added a solution of 50 grams of maleic anhydride in 40 grams of methyl ethyl ketone continuously at a uniform rate throughout a four-hour period. After the lapse of 2 hours 0.2 gram of α,α′-azobis(isobutyronitrile) dissolved in 5 grams of methyl ethyl ketone is added to the reaction mixture and after 4 hours another 0.2 gram of α,α′azobis(isobutyronitrile) dissolved in 5 grams of methyl ethyl ketone is added. The reaction mixture is maintained at a temperature of 80° to 85° C. After the addition of the maleic anhydride monomer is complete, the system is subjected to reduced pressure for one hour to remove unreacted methyl ethyl ketone. The reaction mixture is then allowed to cool to room temperature. The copolymer thus obtained contains 90 parts by weight of vinyl stearate and 10 parts by weight of maleic anhydride. This copolymer has substantially the same properties as the copolymer of Example 4.

EXAMPLE 6

Three self-polishing wax formulations, herein denoted A, B, and C, containing the copolymers of Examples 1, 2, and 4, respectively, are prepared with the following composition:

|  | Percent |
|---|---|
| Vinyl stearate-maleic anhydride copolymer | 10.52 |
| "Renex 30" [1] | 1.60 |
| "Renex 36" [2] | 0.68 |
| Ammonium hydroxide, 26% aqueous | 0.88 |
| Water | 86.32 |
| Total | 100.00 |

[1] A polyoxyethylene adduct of tridecyl alcohol containing 12 ethylene oxide units per molecule. (Atlas Powder Co.)
[2] A polyoxyethylene adduct of tridecyl alcohol containing 6 ethylene oxide units per molecule. (Atlas Powder Co.)

The vinyl stearate-maleic anhydride copolymer, "Renex 30," and "Renex 36" are melted by heating slowly and maintaining the temperature at 90° C. for 10 minutes. The water is heated to boiling and poured incrementally into the hot copolymer melt with vigorous agitation while the temperature is maintain at 90° C. Each increment is completely mixed before the next increment is added. The rate of water addition is increased as the mixture thins out. When the addition of water is complete, the ammonium hydroxide is added rapidly. The solution immediately turns pink, but this color is discharged on agitation.

Formulation A is of good self-polishing wax consistency, but gives a film with some haze on drying. Formulation B is of good self-polishing wax consistency and gives a film which dries to high gloss. Formulation C gels, and dilution to 8 percent solids content is necessary to avoid gelling. Nevertheless this formulation gives a film which dries to a high gloss.

EXAMPLE 7

A self-polishing wax formulation containing the copolymer of Example 3 is prepared with the following composition:

|  | Percent |
|---|---|
| Vinyl stearate-maleic anhydride copolymer | 10.29 |
| "G 3300" [1] | 1.63 |
| "Renex 678" [2] | 1.46 |
| Ammonium hydroxide, 26% aqueous | 0.86 |
| Water | 85.76 |
| Total | 100.00 |

[1] Isopropyl ammonium dodecyl benzene sulfonate. (Atlas Powder Co.)
[2] A polyoxyethylene adduct of nonyl phenol containing 15 ethylene oxide units per molecule. (Atlas Powder Co.)

This formulation is prepared in the same manner as the formulation of Example 6. The product is a wax of good self-polishing consistency, and gives a film which dries to a high gloss.

EXAMPLE 8

Six hundred grams of the copolymer of Example 3 is melted. To the melted batch is added 65.7 grams (10 percent excess) of 2-ethylhexanol while stirring. The mixture is heated to 95° to 105° C. for 2 hours without a catalyst. An 83 percent yield of vinyl stearate-2-ethylhexyl maleate monoester copolymer containing 84 percent by weight of vinyl stearate and 16 percent by weight of 2-ethylhexyl maleate is obtained. This copolymer is an external plasticizer for polyvinyl chloride.

While this invention has been described with reference to specific embodiments thereof, it is understood that the scope of this invention shall be measured only by the scope of the appended claims.

We claim:

1. A copolymer comprising vinyl stearate and a compound selected from the group consisting of maleic anhydride and alkyl maleates in which the alkyl radical contains from 1 to 18 carbon atoms, in a mole ratio in the range of 2.8:1 to 6:1, said copolymer having an average molecular weight of about 1000 to about 3000, said copolymer being produced by polymerizing a mixture of 90 to 95 parts by weight of vinyl stearate and from 5 to 10 parts by weight of maleic anhydride in the presence of a chain transfer agent and a free radical initiator at a temperature of at least 50° C. to produce a crystalline, waxy vinyl stearate-maleic anhydride copolymer, said chain transfer agent being selected from the group consisting of methyl ethyl ketone, methyl propyl ketone, methyl isopropyl ketone, methyl isobutyl ketone, butyraldehyde, valeraldehyde, carbon tetrachloride, 1,2-dichloroethane and 1,3-dichloropropane.

2. A copolymer comprising vinyl stearate and an alkyl maleate in which the alkyl radical contains from 1 to 18 carbon atoms, in a mole ratio in the range of 2.8:1 to 6:1, said copolymer having an average molecular weight of about 1000 to about 3000, said copolymer being produced by polymerizing a mixture of 90 to 95 parts by weight of vinyl stearate and from 5 to 10 parts by weight of maleic anhydride in the presence of a chain transfer agent and an organic peroxide catalyst at a temperature of at least 50° C. to produce a crystalline, waxy vinyl stearate-maleic anhydride copolymer, and reacting the resulting copolymer with a saturated aliphatic alcohol containing from 1 to 18 carbon atoms, said chain transfer agent being selected from the group consisting of methyl ethyl ketone, methyl propyl ketone, methyl isopropyl ketone, methyl isobutyl ketone, butyraldehyde, valeraldehyde, carbon tetrachloride, 1,2-dichloroethane and 1,3-dichloropropane.

3. A process for preparing copolymers of vinyl stearate and alkyl maleate in which the alkyl radical contains not more than 18 carbon atoms and the mole ratio of vinyl stearate to alkyl maleate is in the range of 2.8:1 to 6:1, said copolymers having average molecular weights of about 1000 to about 5000, which comprises preparing a crystalline, waxy copolymer polymerizing a mixture of 90 to 95 parts by weight of vinyl stearate and from 5 to 10 parts by weight of maleic anhydride in the presence of a chain transfer agent and an organic peroxide catalyst at a temperature of at least 50° C., and reacting the resulting copolymer with a saturated aliphatic alcohol containing from 1 to 18 carbon atoms, said chain transfer agent being selected from the group consisting of methyl ethyl ketone, methyl propyl ketone, methyl isopropyl ketone, methyl isobutyl ketone, butyraldehyde, valeraldehyde, carbon tetrachloride, 1,2-dichloroethane and 1,3-dichloropropane.

4. A crystalline, waxy copolymer comprising from 90 to 95 parts by weight of vinyl stearate and from 5 to 10 parts by weight of maleic anhydride, said copolymer having an average molecular weight of about 1000 to about 3000, said copolymer being produced by polymerizing a mixture of 90 to 95 parts by weight of vinyl stearate and from 5 to 10 parts by weight of maleic anhydride in 10 to 25 parts by weight of methyl ethyl ketone in the presence of an organic peroxide catalyst at a temperature of at least 50° C.

5. A process for preparing crystalline, waxy copolymers containing from 90 to 95 parts by weight of vinyl stearate and from 5 to 10 parts by weight of maleic anhydride and having average molecular weights of about 1000 to about 3000 which comprises polymerizing a mixture of 90 to 95 parts by weight of vinyl stearate and from 5 to 10 parts by weight of maleic anhydride in the presence of a chain transfer agent and a free radical initiator at a temperature of at least 50° C., said chain transfer agent being selected from the group consisting of methyl ethyl ketone, methyl propyl ketone, methyl isopropyl ketone, methyl isobutyl ketone, butyraldehyde, valeraldehyde, carbon tetrachloride, 1,2-dichloroethane and 1,3-dichloropropane.

6. A process for preparing crystalline, waxy copolymers containing from 90 to 95 parts by weight of vinyl stearate and from 5 to 10 parts by weight of maleic anhydride and having average molecular weights of about 1000 to about 3000, which comprises polymerizing a mixture of 90 to 95 parts by weight of vinyl stearate and from 5 to 10 parts by weight of maleic anhydride in 10 to 25 parts by weight of methyl ethyl ketone in the presence of an organic peroxide catalyst at a temperature of at least 50° C.

7. The process of claim 6 in which the temperature is in the range of 75° to 100° C.

8. The process of claim 6 in which the peroxide catalyst is benzoyl peroxide.

9. The process of claim 3 in which the saturated aliphatic alcohol is 2-ethylhexyl alcohol.

References Cited by the Examiner

UNITED STATES PATENTS

| | | | |
|---|---|---|---|
| 2,562,852 | 7/1951 | Baer | 260—78.5 |
| 2,615,845 | 10/1952 | Lippincott et al. | 260—78.5 |
| 2,643,246 | 6/1953 | Wilson | 260—78.5 |
| 2,744,098 | 5/1956 | Towne | 260—78.5 |
| 2,876,844 | 3/1959 | Dahlquist et al. | 260—78.5 |

OTHER REFERENCES

Polyethylene, R.A.V. Raff and J. B. Alison, Interscience Publ., Inc., N.Y., 1956, pp. 109–112 relied on.

Source Book of the New Plastics, Simonds, Reinhold Publ. Corp., N.Y., 1959, p. 39 relied on.

Schildknecht, "Polymer Processes," vol. 10, TP 156 P 653 C 3, pp. 177–180 relied on.

JOSEPH L. SCHOFER, *Primary Examiner.*

MILTON STERMAN, LEON J. BERCOVITZ,
*Examiners.*